(12) United States Patent
Moritz et al.

(10) Patent No.: US 9,330,162 B2
(45) Date of Patent: May 3, 2016

(54) METHOD AND APPARATUS FOR PROVIDING TEMPORAL CONTEXT FOR RECOMMENDING CONTENT FOR CONSUMPTION BY A USER DEVICE

(75) Inventors: Simon Moritz, Stockholm (SE); Rickard Coster, Hagersten (SE); Mattias Lidstrom, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 215 days.

(21) Appl. No.: 13/996,265

(22) PCT Filed: Dec. 21, 2010

(86) PCT No.: PCT/EP2010/070438
§ 371 (c)(1),
(2), (4) Date: Jun. 20, 2013

(87) PCT Pub. No.: WO2012/084025
PCT Pub. Date: Jun. 28, 2012

(65) Prior Publication Data
US 2013/0297611 A1    Nov. 7, 2013

(51) Int. Cl.
*G06F 17/30* (2006.01)
*H04H 60/31* (2008.01)
(Continued)

(52) U.S. Cl.
CPC .... *G06F 17/30598* (2013.01); *G06F 17/30044* (2013.01); *H04H 60/31* (2013.01); *H04H 60/46* (2013.01); *H04H 60/65* (2013.01)

(58) Field of Classification Search
CPC .................................................. G06F 17/30598
See application file for complete search history.

(56) References Cited

U.S. PATENT DOCUMENTS 7,644,427 B1    1/2010  Horvitz et al.
8,135,662 B2 *  3/2012  Bollen et al. .................... 706/62
(Continued)

FOREIGN PATENT DOCUMENTS

EP    2068531 A1    6/2009

OTHER PUBLICATIONS

Abbar, S., et al., "Context-Aware Recommender Syetems: A Service-Oriented Approach," VLDB, Aug. 24-28, 2009, Lyon, France, 6 pages.
(Continued)

*Primary Examiner* — Mohammad S Rostami
(74) *Attorney, Agent, or Firm* — Patents on Demand, P.A.; Brian K. Buchheit; Scott M. Garrett

(57) ABSTRACT

A method for operating a system to provide temporal context for recommending items for consumption by a user device is described. The method comprises maintaining a record of items consumed by the user device or a group of devices within a reference period, together with the time of consumption of each item, and a content descriptor associated with each item. Temporal consumption periods are identified within the reference period, each consumption period spanning the consumption of one or more items with similar content descriptors, and each consumption period is associated with its respective content descriptor. An aggregated list is created of consumption periods recorded over a plurality of reference periods. Clusters of similar consumption periods are identified in the aggregated list, and recurring temporal patterns for user device behavior are identified in each cluster. A profile is created for each user device based on the clusters and the recurring temporal patterns for each cluster, and this profile is used to provide the temporal context at the user device.

25 Claims, 3 Drawing Sheets

(51) Int. Cl.
*H04H 60/46* (2008.01)
*H04H 60/65* (2008.01)

(56) References Cited

U.S. PATENT DOCUMENTS

| | | | | |
|---|---|---|---|---|
| 8,375,068 | B1* | 2/2013 | Platt | G06Q 10/10 |
| | | | | 705/7.29 |
| 2003/0229900 | A1* | 12/2003 | Reisman | 725/87 |
| 2006/0053121 | A1* | 3/2006 | Zizys et al. | 707/100 |
| 2007/0073553 | A1* | 3/2007 | Flinn | G06N 99/005 |
| | | | | 705/1.1 |
| 2008/0243406 | A1* | 10/2008 | Pupalaikis | H03H 17/0223 |
| | | | | 702/66 |
| 2009/0228424 | A1 | 9/2009 | Mori et al. | |
| 2009/0292672 | A1* | 11/2009 | Kunjithapatham et al. | 707/3 |
| 2011/0131595 | A1* | 6/2011 | Xue | G06F 17/30044 |
| | | | | 725/9 |

OTHER PUBLICATIONS

Adomavicius, G. and A. Tuzhilin, "Context-Aware Recommender Systems," RecSys, Oct. 23-25, 2008, Lausanne, Switzerland, p. 335.

Baltrunas, L. and X. Amatriain, "Towards Time-Dependant Recommendation Based on Implicit Feedback," CARS, 2009, New York, USA, 5 pages.

Koren, Y., "Collaborative Filtering with Temporal Dynamics," KDD, Jul. 28-Jul. 1, 2009, Paris, France, 9 pages.

* cited by examiner

Consumption genre classification statistics for various times of the day. Points closest to the edge are the most consumed genres, closer to the centre are less consumed genres.

Legend for selected genres

METHOD AND APPARATUS FOR PROVIDING TEMPORAL CONTEXT FOR RECOMMENDING CONTENT FOR CONSUMPTION BY A USER DEVICE

CROSS-REFERENCE TO RELATED APPLICATION(S)

This application is a 35 U.S.C. §371 National Phase Entry Application from PCT/EP2010/070438, filed Dec. 21, 2010, designating the United States, the disclosure of which is incorporated by reference herein in its entirety.

TECHNICAL FIELD

The invention relates to a method and apparatus for providing temporal context for recommending items for consumption by a user device

BACKGROUND

Recommendation systems (sometimes known as recommender systems) are systems which filter information in an attempt to recommend information items (such as, for example, movies, TV programs, video on demand, music, books, news, images, web pages, scientific literature, etc.) that are likely to be of interest to a user. Typically, a recommendation system compares a user profile to some reference characteristics, and seeks to predict the 'rating' that the user would give to an item. These characteristics may be obtained from the information item (known as content based filtering) or the user's social environment (collaborative filtering).

Collaborative filtering finds items to recommend based on mining patterns among implicit or explicit ratings on the items, such as purchase events or star ratings. For example, a user could be recommended an item because his purchase history is similar to the purchase histories of some group of users, and among this group of users many have purchased that item. Content based filtering, on the other hand, finds items to recommend based on mining patterns among the item content descriptors such as genre classification attributes, author names, text descriptions, etc, and matching these to the content patterns of a user's purchased items.

Several researchers have proposed the incorporation of additional data (i.e. context information) to model user behaviour better and improve the recommendations. Examples of such proposals are provided in documents [1] to [4] identified hereinbelow.

As described in [1], there are various ways of incorporating context in Recommender Systems: contextual pre-filtering, contextual post-filtering and contextual modelling. Contextual pre-filtering filters the data available to the recommender system based on the context, creating micro profiles for each context. Contextual post-filtering first retrieves recommendations based on all data, then filters the recommendation results based on the context. For contextual modelling the context is incorporated in the recommendation model.

Document [1] also mentions the possibility of providing temporal contextual information. For example, a travel recommender system would provide a very different vacation recommendation for winter as compared to summer. Furthermore, several researchers (e.g. [1], [2]) have described various ways of using temporal aspects of ratings in order to improve the accuracy of the recommendations, for example by decreasing the influence of older ratings, although these methods are not concerned with creating contextualized recommendations.

The method proposed in [3] utilises temporal context to improve music recommendations, relying on manually defined time splits. The method described in [4] tries to discover contexts automatically but finds only contexts based on surface parameters such as time and date.

SUMMARY

It is an object of the invention to improve the provision of temporal context outlined above.

In accordance with one aspect of the invention there is provided a method for operating a system to provide temporal context for recommending items for consumption by a user device. The method comprises maintaining on a storage medium a record of items consumed by the user device or a group of devices within a reference period, together with the time of consumption of each item, and a content descriptor associated with each item. Temporal consumption periods are identified within the reference period, each consumption period spanning the consumption of one or more items with similar content descriptors, and each consumption period is associated with its respective content descriptor. An aggregated list is created of consumption periods recorded over a plurality of reference periods. Clusters of similar consumption periods are identified in the aggregated list, and recurring temporal patterns for user device behaviour are identified in each cluster. A profile is created for each user device based on the clusters and the recurring temporal patterns for each cluster, and this profile is used to provide the temporal context at the user device.

In this context, it will be appreciated that a plurality of reference periods encompasses any number of reference periods greater than one.

The identification of consumption periods may comprise searching for groups of items whose content descriptors match to within a threshold similarity. A consumption period may be allocated to a group of items only if the span of the consumption period is less than a threshold time. The consumption periods within a reference period may overlap each other.

A first weighting factor for each consumption period may be calculated by determining the fraction of time during the consumption period for which items associated with the content descriptor of the consumption period are consumed. A second weighting factor for each consumption period may be calculated by combining the fraction of time during the consumption period for which each item is consumed with the fraction of each item consumed compared to the total amount of each item available. A third weighting factor for each consumption period, which decays over time, may be calculated. The identification of clusters may prioritise consumption periods having high first and/or second and/or third weighting factors and/or long time spans.

Constructing a temporal profile may include, for each cluster, calculating a function defining a probability that the content associated with that cluster will be consumed at any given time in a reference period.

The content descriptors of available items may be matched with the content descriptors of each cluster, enabling a recommendation to be made at the user device based on the item which matches the cluster which has the highest probability at that time.

The step of maintaining a record of items consumed by the user device or group of devices may include associating with each item a record of the location and/or type of device at which each item was consumed.

The reference period may be one day.

The items may include inter alia television programs, radio programs, films, video clips, web content, and/or mobile device applications.

The method may be carried out by an operator, and may include sending a recommendation from the operator to the user. Alternatively, the method may be carried out by a user device.

In accordance with another aspect of the present invention there is provided a unit for providing temporal context for recommending items for consumption at a user device. The unit comprises a transceiver for sending data towards and receiving data from the user device. A controller is operatively connected to the transceiver for identifying items consumed by the user device or a group of user devices within a reference period, the time of consumption of each item, and a content descriptor associated with each item. A storage medium is provided for maintaining a record of the items, times and content descriptors identified by the controller. The controller is configured to identify temporal consumption periods within the reference period, each consumption period spanning the consumption of one or more items with similar content descriptors, and associate each consumption period with its respective content descriptor. The controller is further configured to create an aggregated list of consumption periods recorded over many reference periods and store the aggregated list in the storage medium, identify clusters of similar consumption periods in the aggregated list, identify recurring temporal patterns for user device behaviour in each cluster, construct a profile for each user device or group of devices based on the clusters and the recurring temporal patterns for each cluster, generate a time-specific recommendation for the user device from the profile, and cause the transceiver to send the recommendation towards the user device.

The controller may be configured to identify consumption periods by searching for groups of items whose content descriptors differ by less than a threshold amount and whose span is less than a threshold time.

The controller may be configured to calculate, for each consumption period, one or more of a first weighting factor determined by the fraction of time during the consumption period for which items associated with the content descriptor of the consumption period are consumed; a second weighting factor determined by combining the fraction of time during the consumption period for which each item is consumed with the fraction of each item consumed compared to the total amount of each item available; and a third weighting factor which decays over time. The controller may be configured to prioritise consumption periods having high first and/or second and/or third weighting factors and/or long time spans when identifying clusters.

The controller may be configured, when constructing a temporal profile, to calculate a function defining a probability that the content associated with that cluster will be consumed at any given time in a reference period.

The controller may be configured to match content descriptors of available items with the content descriptors of each cluster and generate a recommendation for the user device based on the item which matches the cluster which has the highest probability at that time.

The unit may be controlled by an operator.

In accordance with a further aspect of the present invention there is provided a user device for providing content to a user. The device comprises a receiver for receiving content items and a content descriptor for each item from a network. An output unit is provided for providing the content items to the user. A controller is operatively connected to the receiver and output unit for decoding items received from the operator and forwarding said items to the output unit. A storage medium is provided for maintaining a record of the items provided to the user within a reference period, the time of consumption of each item, and the content descriptor associated with each item. The controller is configured to identify temporal consumption periods within the reference period, each consumption period spanning the consumption of one or more items with similar content descriptors, and associating each consumption period with its respective content descriptor; create an aggregated list of consumption periods recorded over many reference periods and store the aggregated list in the storage medium; identify clusters of similar consumption periods in the aggregated list; identify recurring temporal patterns for user behaviour in each cluster; construct a profile for the user based on the clusters and the recurring temporal patterns for each cluster; generate a time-specific recommendation for the user from the profile; and cause the output unit to provide the recommendation to the user.

The invention also provides a computer program, comprising computer readable code which, when run by a unit or user device, causes the unit or user device to perform any of the methods described above. The invention also provides a computer program product comprising a computer readable medium and a computer program as described above, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

Figure 1:
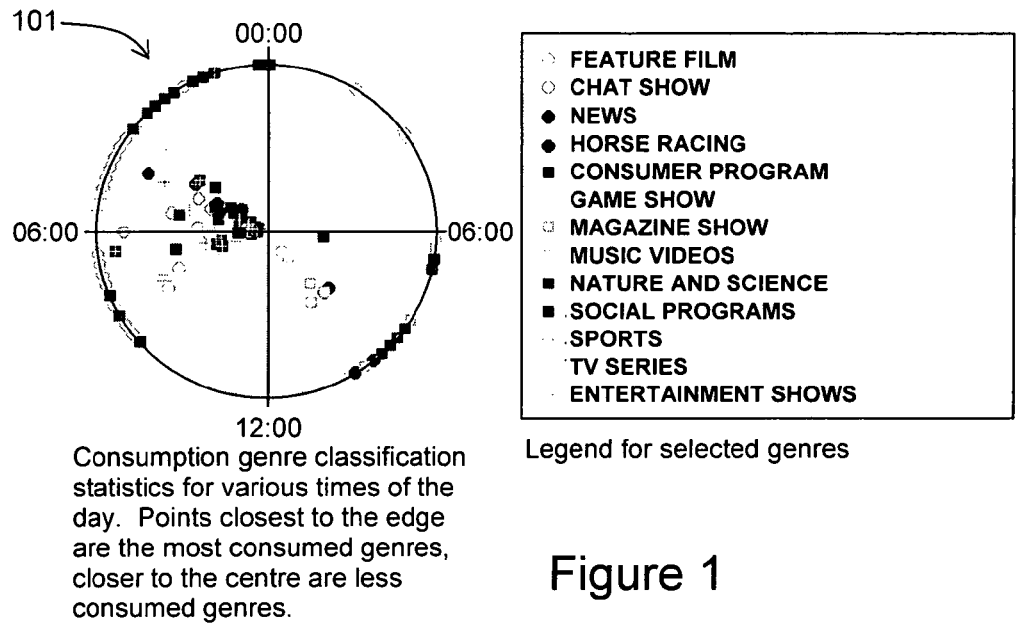
FIG. 1 is a schematic diagram illustrating the results of an analysis of TV viewing consumption logs.

FIG. 1 is a schematic diagram illustrating the results 101 of an analysis of TV viewing consumption logs from Media Measurement Scandinavia (MMS), a Swedish TV measurement organization. Five weeks of TV consumption data for a single Swedish household are shown. The figure displays the program genres that are consumed at different times of a day for this household. Points closest to the edge are the most consumed genre at that time; points closer to the centre are less consumed genres at the same time. Different household consumption logs give rise to different plots, but for many of the households there are clear temporal content patterns. It is therefore desirable to be able to provide a temporal context in a recommender system in order to reflect these patterns.

In order to understand how temporal context can be provided, it is beneficial to consider an example system for recommending television programs to users. The example system has a set of users U and a set of items I (i.e. television programs). The system also includes a set of (weighted) features F and a set of actions A. An action may be considered to be a relation between a user and an item, together with the "strength" or weight of that relation, and the time and duration of the action. An example is a user's viewing of a TV program, where the strength can be measured by the fraction of the TV program viewed (i.e. how long the program was viewed for compared to the complete length of that program). A feature is a (weighted) content based attribute that is used to describe in part some set of items, such as genre, channel, artist etc. (e.g. Genre=Action for movies, Channel=Discovery for TV programs or Artist=John Doe for a music item). These content based features need not be interpretable by humans: features derived by feature engineering techniques such as PCA can be used if appropriate.

The method used by the system collects, for each day d and user u, the set A(u,d) which is the set of all actions made by user u on the day d. All items in the set of actions are described with features from the set F to form a set of content-based actions CA(u,d).

An example of CA(u,d) is a set of TV viewing consumptions for a user during a day. The following is an exemplary viewing consumption log, where each entry in the log contains user id, viewing date, viewing time, viewing weight and the first few attributes.

User ID, Date, Time, Weight, Content type(s), Item, . . .
1, 101005, 06:25-06:30, 0.25, News, World News, . . .
1, 101005, 16:30-16:45, 1.00, News, Regional News, . . .
1, 101005, 16:50-17:30, 0.78, Cartoon, Nickelodeon, . . .
1, 101005, 17:30-18:00, 0.25, Music, Live, Skansen, . . .
1, 101005, 18:00-18:30, 0.85, Cartoon, Barnkanalen, . . .
1, 101005, 19:03-20:10, 0.44, Action, Drama, Tom Cruise, . . .

It will be appreciated that viewing logs in practice are likely to contain more information than shown here, and may contain many more entries for one day, but consideration of such logs would make it harder to appreciate the principles of the invention. As the skilled person would understand, the consumption log could, in an implementation, contain many hundreds of thousands (or even millions) of rows, depending on how many user devices are recorded in the log. There may potentially be hundreds of content types and thousands of item types, for example.

For each user on each day, the method first finds periods in CA(u,d) where actions have similar content types. This is controlled by two variables; the minimum average pair wise content similarity $\Delta$ between items and the maximum time span $T_{max}$ allowable for a temporal period. The content similarity $\Delta$ can be determined by considering elements in the descriptor such as genre, keywords, contributors, description or similar terms, or a numerical representation of such terms or a numerical combination of them.

For each such located time span period, the attributes are merged as content descriptors for the period.

This process gives rise to a new data set CA'(u,d). In this set, weight is split into two variables: w1, corresponding to the fraction of the total time of that period during which that content type was viewed, and w2 that estimates, based on the data, the fraction that the content descriptors match the consumption during a period. It also be noted that the start and stop times for periods could be overlapping.

In the above example, assume that $T_{max}$ is set to 240 minutes, and then consider the first two content-based actions in the list above. Both have content type "News" and therefore have a high content similarity $\Delta$. However, the time spanned by these two entries is over ten hours (from 06:25 to 16:45), and is therefore above $T_{max}$. Therefore no merged temporal period is recovered from these two entries.

Then consider the third and fifth entries. Both have content type "Cartoon" and thus a high content similarity $\Delta$. The third entry begins at 16:50 and the fifth entry ends at 18:30. So the total time spanned is 100 minutes, which is less than $T_{max}$. These two entries can therefore be merged into a single temporal period.

The weights for the third and fifth item are merged by setting the content features to a weighted average of the two items, and updating the time span to cover all (both) items and also set two new weights. This provides a combined entry having the following attributes:
1, 101005, 16:50-18:30, w1, w2, Cartoon, Nickelodeon, Barnkanalen, . . .

The weight w1 is then updated to the amount that this content type (Cartoon) is consumed during the time period. This amounts to 0.7, because the two shows that were similar were consumed during 70 of the 100 minutes of the time period. The second weight w2 defines how much of the available programs of that type were consumed. The original figures were 40 minutes and a weight of 0.78 for the third item, and 30 minutes and a weight of 0.85 for the fifth item. The combined weight w2 is calculated as 40/100*0.78+30/100*0.85=0.57.

The simplified consumption log is thus transformed to a temporal period log as
User ID, Date, Time, w1, w2, Content type(s), Item(s), . . .
1, 101005, 06:25-06:30, 1.0, 0.25, News, World News, . . .
1, 101005, 16:30-16:45, 1.0, 1.00, News, Regional News, . . .
1, 101005, 16:50-18:30, 0.7, 0.57, Cartoon, Nickelodeon, Barnkanalen, . . .
1, 101005, 17:30-18:00, 1.0, 0.25, Music, Live, Skansen, . . .
1, 101005, 19:03-20:14, 1.0, 0.44, Action, Drama, Tom Cruise, . . .

The above log illustrates a record of viewing by content type for one user for one day. It will be noted that every entry in the log corresponds to a temporal period in which consumption has taken place, which may correspond to the consumption of one item or more than one item, and can be considered to be a "consumption period". In this example, the first and second consumption period entries each corresponds to a single item, but the third corresponds to two items. This log is combined with similar logs for other days to populate a day-independent set CA'(u) for each user containing all consumption period entries, each of which may be consumption of a single item or a merged temporal period within which two or more items are consumed. This set can now be mined using clustering methods such as Principal Component Analysis or Support Vector Clustering, for example, to find the most dominant content-based clusters. The most dominant content-based clusters reflect the most dominantly consumed content. Dominance determination includes factors such as number (this will be high if there is a similar entry for an item or merged period from the same time every day), and an overall weight calculated from a combination of w1, w2 and the length of the temporal period of the consumption. In other words, a long period with a high proportion of consumption of a particular content type will carry more weight than a very short period with the same proportion of the same content type. Weight can also be modified on a temporal basis, so that items or periods consumed a long time ago carry less weight than items consumed recently.

As an example, applying clustering in the case of TV consumptions for a user who mostly consumes News and Movies will probably have clusters that resemble this consumption.

Clustering the set CA'(u) for the user in the example above might reveal, for example, that there are four dominant content types consumed with large time spans:
Cluster label, Content type, Item(s), . . .
$c_1$, Cartoon, Nickelodeon, Barnkanalen, . . .

$c_2$, News, Regional News, CNN, . . .
$c_3$, Movies, Drama, . . .
$c_4$, Sports, Football, Ice Hockey, . . .

Each of these clusters is further analyzed for temporal patterns. As this is a now one-dimensional time series data, any suitable time series analysis tool, such as Auto-Correlation, for example, can be used.

There will be four time series analyses for the example user discussed above, since there are four dominant content clusters. Each of these analyses results in a probability function $f\_c_n(t)$ which indicates a probability that content type of a particular cluster $c_n$ should be consumed by that user at any given time t.

For each user there is now a set of clusters C and corresponding functions $f\_c_n(t)$ for each $c_n$ in C. A profile for the user can therefore be created from this set.

A model may now be created so that the user may begin receiving recommendations. In order to create the model, the representations of items available for consumption are matched against the content types of the dominant clusters. In the context of TV programs, this could be the items available in an Electronic Program Guide (EPG) for the evening, the rest of the week, etc.

Each possible item will then have a content similarity value with a cluster, and for the best matching cluster its corresponding time series probability function can be queried for the suitability of consuming that item for a particular time. When the user switches on the television, the item which matches the content of the cluster with the highest probability value $f\_c_n(t)$ at that time is recommended.

Figure 2:
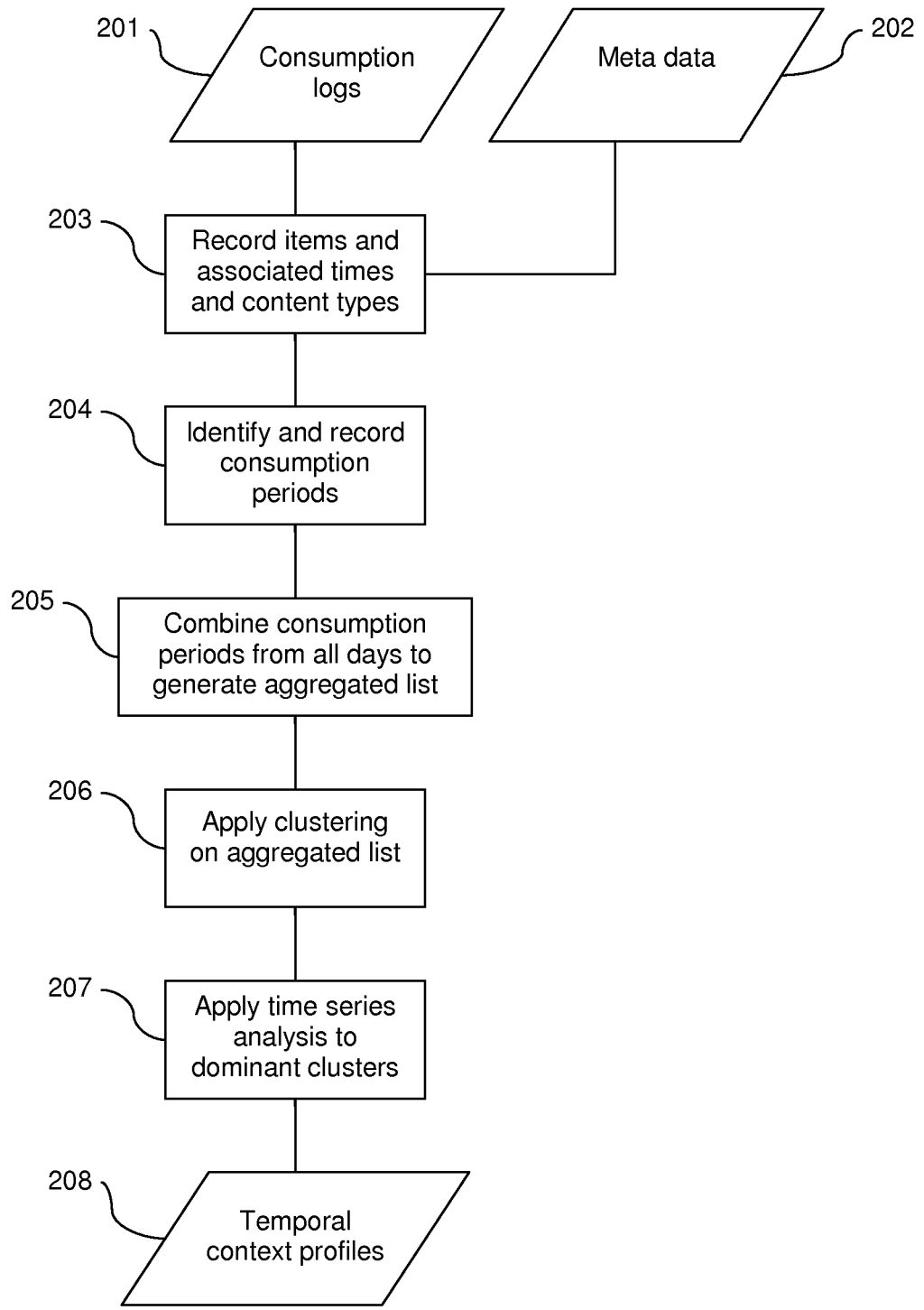
FIG. 2 is a flow diagram illustrating the steps carried out in providing a recommendation.

FIG. 2 is a flow diagram illustrating these steps as follows:
201. The items consumed by a user (or household, or family, etc.) are recorded each day.
202. Each item is associated with meta data (including content type, etc.)
203. A set CA(u,d) of content based descriptions of the user's consumption of items for the day is constructed from the record of the items consumed and the metadata associated with each item.
204. Merged temporal periods containing more than one item with similar content are identified for the user for that day. A set CA'(u,d) is constructed, having elements corresponding to all consumption periods in which content has been consumed.
205. A set CA'(u) is constructed, containing the elements from the sets CA'(u,d) for all days (e.g. at least a week, or at least a month).
206. Clustering is applied to the elements of the set CA'(u) to identify the most dominant content clusters having large consumption periods and high weighting.
207. Time series analysis is applied to the dominant clusters to find temporal analysis in user behaviour.
208. Profiles are constructed for each user (or household, or family, etc.) for the identified cluster and temporal pattern.

It will be appreciated that it is possible to create several temporal profiles for any given time period using the method described above. There may be different consumption behaviour during a given time period, generating separate temporal profiles. This could be due to the fact that there could be several users in a home, and also several terminals via which media is consumed. Another reason for multiple profiles could be influences from the user behaviour. For example, children's TV shows might be consumed every day between 18.00 and 19.00 except some Wednesdays and Fridays, when the children in the family are not available to view TV.

Given that there may be multiple profiles for a set timeframe, a method to select the appropriate profile to use may be implemented by analysing the separate profiles and identifying, from the user's actions, when consumptions start within the given timeframe. It is possible to find structural properties from analysis of the temporal profile. Such structural properties may be human interpretable, or may be based on features extracted by feature engineering. It is then possible to match this against a similar profile of a media item. This means that, by using the first consumption, the correct profile can easily be selected for both persons and devices.

It will be appreciated that the system described above is based on logging items per day, but other reference periods may be used. For example, the type of content watched may vary on a daily basis but be relatively consistent over the course of a week. In some circumstances it may therefore be appropriate to use a week as a basic time period, although this can also be accounted for using the structural properties of the profile, as described above.

The approach described above enables users to access relevant content on the TV with one click. This, for example, offers parents a more relaxed Saturday morning since their children, in principle, only need to learn how to turn on the TV to get suitable content displayed. This is possible since the system will have classified Saturday mornings to a TV consumption period in which the children are mainly using the TV. The reversed scenario would be Friday evenings when the parents are watching movies while the children are asleep. It would be as easy for them to find the relevant content by one click of a button if Friday evenings been classified to a parent movie evening using the parent profile.

It is also possible to tweak the recommendations according to other circumstances. For example, around Christmas, the users of the system may be more biased to Christmas content, such as music, during that period than otherwise. The system can therefore weight such content so that it is more likely to be recommended.

It will further be appreciated that the system described is not limited to TV consumption, but could also be used, for example, to find suitable applications on a mobile device. In this example the system would identify a certain number of application consumption time periods. The applications installed on the device could be sorted automatically so that the applications most likely to be used will be displayed, e.g. presenting subway time schedule app(s) before leaving work, lunch restaurant menu app(s) around lunch time or remote control app(s) around normal TV consumption time.

Figure 3:
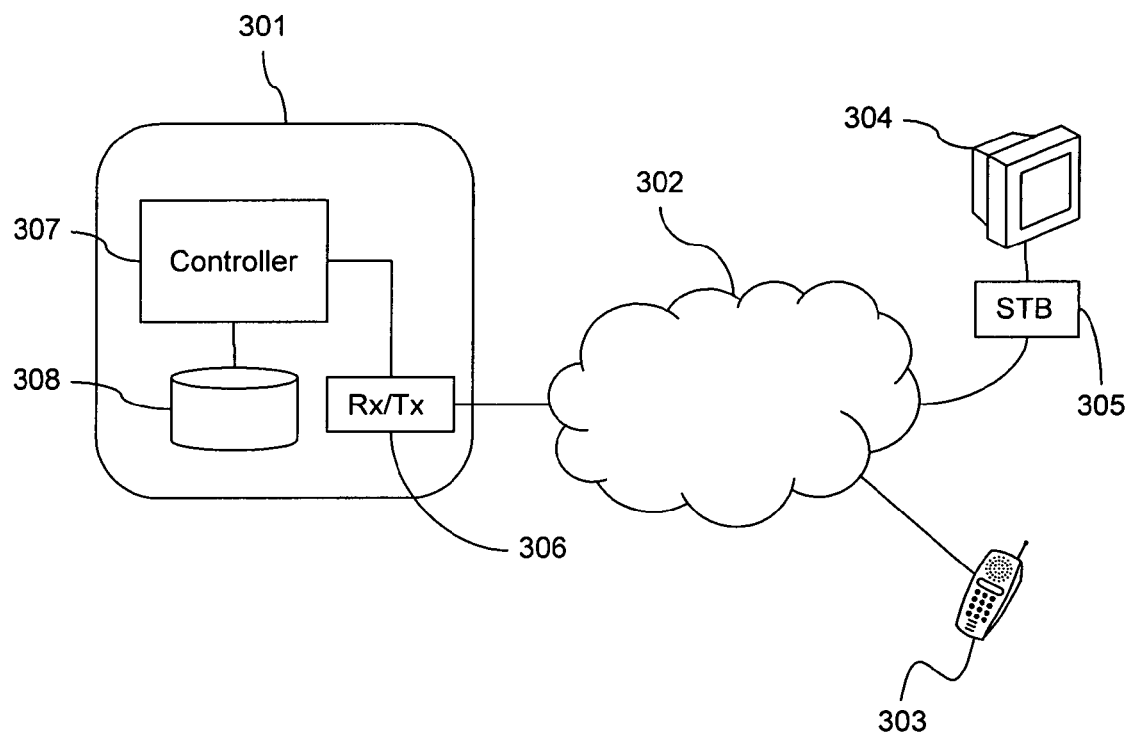
FIG. 3 is a schematic diagram of a system suitable for putting the recommendation into effect.

FIG. 3 is a schematic diagram of a system suitable for putting the recommendation system into effect. A unit 301 (which may, for example, be controlled by an operator) is responsible for delivering content to users via a network 302 (which may comprise a broadcast network, IP network, mobile network, etc.). User devices such as a mobile device 303 and television 304 connected to a set top box 305 are connected to the network. It will be appreciated that the unit 301 may be provided close to the user devices or close to an operator in the network. The unit 301 may even be provided to provide recommendations for the devices in a single household. If this is the case, the location and/or type of each device may be taken into account.

The unit 301 includes a transceiver 306 for sending data towards user devices 303, 305 and receiving data from such devices. A controller 307 controls the operation of the transceiver 306 and is itself operatively connected to a storage medium 308. The storage medium could be e.g. a RAM (Random-access Memory), a ROM (read-only memory) a hard disk, a flash memory or an EEPROM (Electrically Erasable Programmable ROM).

Content to be sent to the user may be stored on the storage medium 308 in the unit or elsewhere in the network 302. Suppose that a user requests content from an operator. This content is some item (whether a television program, mobile device application, etc.) When this content is sent to the user 303, 305, the controller 307 identifies the items sent towards the user 303, together with the time of consumption of each item and a content descriptor (the content type) of each item. Where items have a finite length, the controller may also identify the fraction of the total length actually received by the user.

A record of these items, together with their times of consumption and content types, is stored on the storage medium 308. The record is stored per day (or other reference period) as described above. For each reference period, the controller is configured to identify temporal consumption periods associated with a content type as above. As records for many days are stored, the controller is configured to create a day-independent aggregated list of consumption periods and store it in the storage medium 308. The controller also performs cluster analysis, identifies patterns in the clusters, and creates user profiles. It can then create a recommendation for the user which is sent via the transceiver 302 towards the user 303 or 305.

It will be appreciated that the controller may comprise a single processor, or may be any arrangement that is suitable for carrying out the actions described. One or more individual processors may be used to implement the controller, and it is also conceivable that the transceiver and controller may be incorporated together or in any combination in one (or more) circuit.

The functional modules described above can be implemented as program modules of a computer program comprising code means which when run by a processor in the unit 301 causes the unit to perform the above-described functions and actions. The processor may not only be a single CPU (Central processing unit), but could comprise two or more processing units in the unit 301. For example, the processor may include general purpose microprocessors, instruction set processors and/or related chips sets and/or special purpose microprocessors such as ASICs (Application Specific Integrated Circuit). The processor may also comprise board memory for caching purposes. The computer program may be carried by a computer program product in the unit 301 connected to the processor. The computer program product comprises a computer readable medium on which the computer program is stored. For example, the computer program product may be a flash memory, a RAM (Random-access memory) ROM (Read-Only Memory) or an EEPROM (Electrically Erasable Programmable ROM), and the computer program modules described above could in alternative embodiments be distributed on different computer program products in the form of memories within the unit 301.

Figure 4:
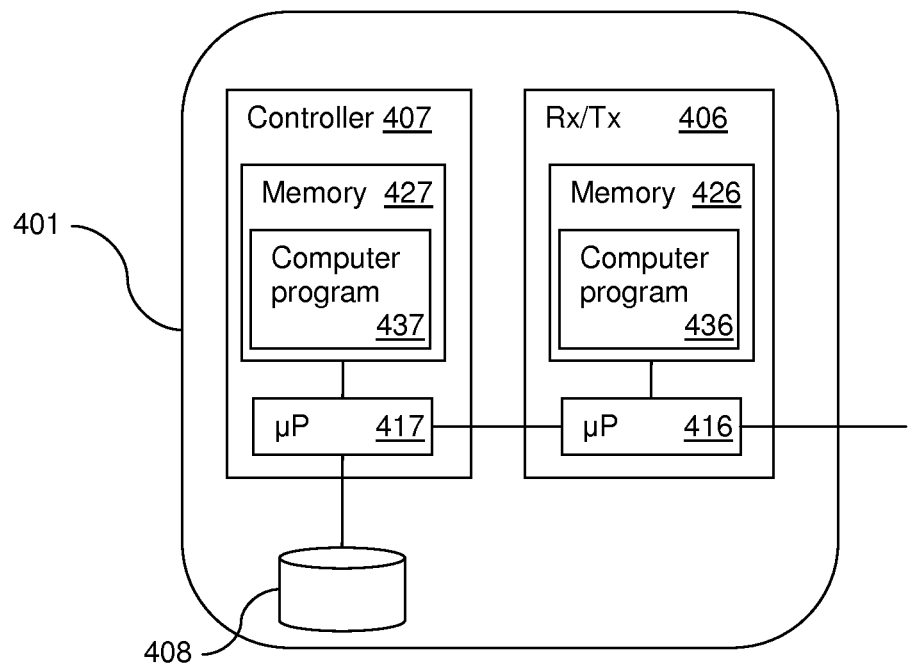
FIG. 4 is a schematic diagram of an configuration of a unit for putting the recommendation into effect.

In practice the unit is likely to be operated by software, and FIG. 4 is an illustration of a unit 401, similar to the unit 301 shown in FIG. 3, illustrating how this may be implemented. In this case the unit again includes a transceiver 406, controller 407 and storage medium 408. Each of the transceiver 406, and controller 407 includes a processing unit 416, 417. Each processing unit 416, 417 is associated with a computer program product in the form of a memory 426, 427, e.g. one or more of a ROM, harddisk, flash memory or EEPROM. The memory 426 associated with the transceiver 406 comprises a computer program 436 which can be run by the processing unit 416 to control the transmittal and receipt of data from the users 303, 305 and other network elements. The storage medium 408 could again be e.g. a RAM, ROM, hard disk, flash memory or EEPROM, or distributed over several processors in the same way as described above with reference to FIG. 3. Indeed, sufficient storage may be provided by the memory 427 of the controller 407, in which case the storage medium 408 may be partially or completely incorporated into the memory 427 of the controller 407. The memory 427 associated with the controller 407 comprises a computer program 437 which can be run by the processing unit 417, as a result of which the processing unit 417 identifies the items sent towards the user 303, together with the time of consumption of each item and a content descriptor (the content type) of each item. Where items have a finite length, the controller may also identify the fraction of the total length actually received by the user. The computer program also causes the processor to identify temporal consumption periods each associated with a content type, create a day-independent aggregated list of consumption periods, perform cluster analysis, identify patterns in the clusters, create user profiles, and create a recommendation for the user which is sent via the transceiver 402 towards the user 303 or 305.

It will be appreciated that each processing unit 416, 417 may comprise one or more individual processors. It will further be appreciated that the processing units 416, 417 are shown as separate entities in FIG. 3 to assist understanding, but may be provided as part of a single entity or set of entities providing processing capabilities to the transceiver and/or controller. Similarly, the memories 426, 427 may be discrete memories or memory spaces associated with separate processors or may be part of a larger entity. The computer programs 436, 437 may be separate entities, or may be constituent parts of the same computer program, which may be run by separate processors or the same processor.

A unit controlled by an operator is a suitable point for providing the temporal context for recommendations, since the meta data which provides content descriptors can be stored within the unit or can pass therethrough whenever data is sent to the user. Units controlled by operators also usually have fast processors capable of performing the calculations necessary for the cluster analysis to produce realistic recommendations. However, it will be appreciated that recommendations could also be calculated at the user end of the system, either by units placed close to the user devices, or even, for example, by a user device such as a STB 305 or mobile device 303.

Figure 5:
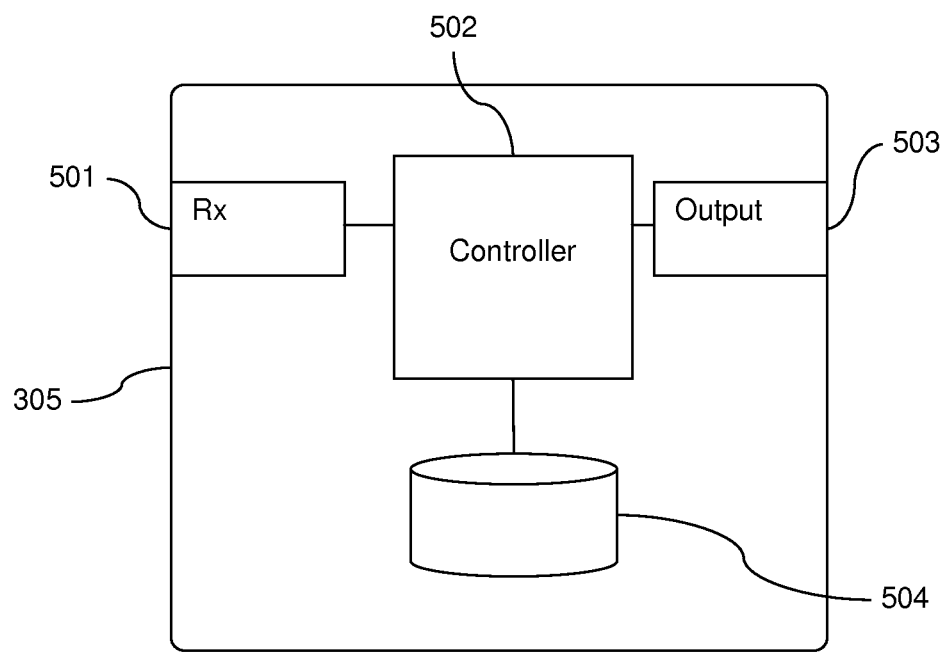
FIG. 5 is a schematic drawing of a Set Top Box.

FIG. 5 is a schematic drawing of a user device in the form of the STB 305 shown in FIG. 3. The STB 305 includes a receiver 501 for receiving content items and meta data (e.g. content type) from an operator or other entity in a network. A controller 502 is configured to decode the items and pass them to an output unit 503 for providing the items to the unit. The output unit 503 may be connected to a display screen and/or audio reproduction apparatus, for example, so that the user can view or hear media applications or access apps, etc. A storage medium 504 maintains a record of the items provided to the user within a reference period, the time of consumption of each item, and the meta data associated with each item. The controller carries out the methods described above—i.e. it identifies temporal consumption periods within the reference period, creates an aggregated list over many reference periods, performs cluster analysis on the list to identify clusters, identifies recurring temporal patterns in each identified cluster, constructs a profile for the user, and generates a time-specific recommendation for the user. This recommendation can then be passed to the user via the output unit 503.

Thus the approach described above automatically discovers temporal contexts and provides recommendations suited for a particular temporal context. It can be applied to any recommendation scenario where users exhibit temporal trends when consuming items. It makes it possible to identify the correct profile for both users and devices within a given time period based on user actions. This assists with recommending the right item at the right time.

This type of system is highly relevant for areas where the temporal context of item consumption is in part determined, for example, by usage habits, social habits, item availability, etc. One example is TV consumption, where the decision of what to watch is determined in part by, for example, watching habits, family situation, program availability etc.

The approach identifies periods within a day (or other reference period) where the content similarities are high. The consumptions within a identified consumption period are then merged to form a representative for that consumption period. All consumption periods for all days for a user are then analysed by clustering, to find the most dominant content based periods. These dominant content based periods reflect the meta data content attributes of the user's most consumed items. The final step is to apply time series analysis for each dominant cluster. As this has now been reduced to a one-dimensional time series problem, any suitable technique can be employed. The recurring patterns for each dominant content period are then used to produce temporal context profiles for the user.

It will be appreciated that variations from the above described embodiments may still fall within the scope of the invention.

REFERENCES

[1] G. Adomavicius and A. Tuzhilin. Context-aware recommender systems. In P. Pu, D. G. Bridge, B. Mobasher, and F. Ricci, editors, RecSys, pages 335-336. ACM, 2008.

[2] L. Baltrunas and X. Amatriain. Towards time-dependant recommendation based on implicit feedback. In Workshop on Context-Aware Recommender Systems (CARS 2009). New York, 2009.

[3] S. Abbar, M. Bouzeghoub, and S. Lopez. Context-aware recommender systems: A service oriented approach. VLDB PersDB Workshop, 2009.

[4] Koren, Y. Collaborative filtering with temporal dynamics, Proceedings of the 15th ACM SIGKDD international conference on Knowledge discovery and data mining, Jun. 28-Jul. 1, 2009, Paris, France.

The invention claimed is:

1. A method for operating a system to provide temporal context for recommending items for consumption, comprising:

maintaining on a storage medium a record of items consumed within a reference period, together with a time of consumption of each item, and a content descriptor associated with each item;

using the record of items to define a first temporal consumption period associated with a first set of one or more similar content descriptors, wherein defining the first temporal consumption period comprises: (a) using the record of items to identify a first consumed item associated with a first content descriptor, (b) using the record of items to determine a first time period during which the first consumed item was consumed, (c) using the record of items to identify a second consumed item associated with the first content descriptor, (d) using the record to determine a second time period during which the second consumed item was consumed, said second time period not overlapping with said first time period, and (e) defining the first temporal consumption period such that the first temporal consumption period encompasses both the first time period during which the first consumed item associated with the first content descriptor was consumed and the second time period during which the second consumed item associated with the first content descriptor, was consumed;

using the record of items to define a second temporal consumption period associated with a second set of one or more similar content descriptors, wherein defining the second temporal consumption period comprises:

(a) using the record of items to identify a third consumed item associated with a third content descriptor, (b) using the record of items to determine a third time period during which the third consumed item was consumed, (c) using the record of items to identify a fourth consumed item associated with a fourth content descriptor, (d) using the record to determine a fourth time period during which the fourth consumed item was consumed, said fourth time period not overlapping with said third time period, (e) determining whether the fourth content descriptor matches the third content descriptor within a threshold similarity, and (e) in response to determining that the fourth content descriptor matches the third content descriptor within a threshold similarity, defining the second temporal consumption period such that the second temporal consumption period encompasses both the third time period and the fourth time period;

creating an aggregated list of temporal consumption periods recorded over a plurality of reference periods;

identifying clusters of similar temporal consumption periods in the aggregated list;

identifying recurring temporal patterns;

constructing a profile based on the clusters and the recurring temporal patterns for each cluster; and using the profile to provide a temporal context.

2. The method of claim 1, further comprising using the record of items to define a second temporal consumption period associated with a second set of one or more similar content descriptors, wherein defining the second temporal consumption period comprises:

(a) using the record of items to identify a third consumed item associated with a second content descriptor, (b) using the record of items to determine a third time period during which the third consumed item was consumed, (c) using the record of items to identify a fourth consumed item associated with the second content descriptor, (d) using the record to determine a fourth time period during which the fourth consumed item was consumed, said fourth time period not overlapping with said third time period, (e) determining whether the sum of the duration of the third time period and the duration of the fourth time period is less than a predetermined maximum time period threshold, and (f) in response to determining that the sum of the duration of the third time period and the duration of the fourth time period is less than the predetermined maximum time period threshold, defining the second temporal consumption period such that the second temporal consumption period encompasses both the third time period and the fourth time period.

3. The method of claim 2, wherein the first temporal consumption period overlaps the second temporal consumption period.

4. The method of claim 1, further comprising:
calculating a first weighting factor (wf1) for the first temporal consumption period by calculating: wf1=(d1+d2)/D1, wherein d1 is the duration of the first time period, d2 is the duration of the second time period and D1 is the duration of the first temporal consumption period.

5. The method of claim 4, further comprising:
calculating a second weighting factor (wf2) for the first temporal consumption period by calculating: wf2=1/D1 (d1*w1+d2*w2), wherein w1 is a weight associated with the first consumed item and w2 is a weight associated with the second consumed item.

6. The method of claim 1, further comprising calculating a weighting factor for the first temporal consumption period, wherein the weighting factor decays over time.

7. The method of claim 4, wherein the identification of clusters prioritises consumption periods having high first and/or second and/or third weighting factors.

8. The method of claim 1, wherein the identification of clusters prioritises consumption periods having long time spans.

9. The method of claim 1, wherein constructing a temporal profile includes, for each cluster, calculating a function defining a probability that the content associated with that cluster will be consumed at any given time in a reference period.

10. The method of claim 9, further comprising matching content descriptors of available items with the content descriptors of each cluster and making a recommendation at a user device based on the item which matches the cluster which has the highest probability at that time.

11. The method of claim 1, wherein the step of maintaining a record of items consumed by a user device or group of devices includes associating with each item a record of a location in which each item was consumed.

12. The method of claim 1, wherein the step of maintaining a record of items consumed by a user device or group of devices includes associating with each item a record of the type of device on which each item was consumed.

13. The method of claim 1, wherein the reference period is one day.

14. The method of claim 1, wherein the items include one or more from the following list:
television programs;
radio programs;
films;
video clips;
web content;
mobile device applications.

15. The method of claim 1, further comprising sending a recommendation from an operator to a user.

16. A user device operating the method of claim 1.

17. An apparatus for providing temporal context for recommending items for consumption, the apparatus comprising:
a transceiver for sending data and receiving data;
a processor operatively connected to the transceiver for identifying items consumed within a reference period, a time of consumption of each item, and a content descriptor associated with each item; and
the storage medium for maintaining a record of the items, times and content descriptors identified by the processor;
wherein the processor is configured to:
use the record of items to define a first temporal consumption period associated with a first set of one or more similar content descriptors, wherein using the record of items to define the first temporal consumption period comprises: (a) using the record of items to identify a first consumed item associated with a first content descriptor, (b) using the record of items to determine a first time period during which the first consumed item was consumed, (c) using the record of items to identify a second consumed item associated with the first content descriptor, (d) using the record to determine a second time period during which the second consumed item was consumed, and (e) defining the first temporal consumption period such that the first temporal consumption period encompasses both the first time period and the second time period;
wherein the processor is further configured to:
use the record of items to define a second temporal consumption period associated with a second set of one or more similar content descriptors, wherein defining the second temporal consumption period comprises: using the record of items to identify a third consumed item associated with a third content descriptor, (b) using the record of items to determine a third time period during which the third consumed item was consumed, (c) using the record of items to identify a fourth consumed item associated with a fourth content descriptor, (d) using the record to determine a fourth time period during which the fourth consumed item was consumed, said fourth time period not overlapping with said third time period, (e) determining whether the fourth content descriptor matches the third content descriptor within a threshold similarity, and (e) in response to determining that the fourth content descriptor matches the third content descriptor within a threshold similarity, defining the second temporal consumption period such that the second temporal consumption period encompasses both the third time period and the fourth time period;
create an aggregated list of consumption periods recorded over many reference periods and store the aggregated list in the storage medium;
identify clusters of similar consumption periods in the aggregated list;
identify recurring temporal patterns;
construct a profile based on the clusters and the recurring temporal patterns for each cluster;
generate a time-specific recommendation from the profile; and
cause the transceiver to send the recommendation.

18. The apparatus of claim 17, wherein the processor is configured to identify consumption periods by searching for groups of items whose content descriptors differ by less than a threshold amount and whose span is less than a threshold time.

19. The apparatus of claim 17, wherein the processor is configured to calculate, for each consumption period, one or more of:
a first weighting factor determined by the fraction of time during the consumption period for which items associated with the content descriptor of the consumption period are consumed;
a second weighting factor determined by combining the fraction of time during the consumption period for which each item is consumed with the fraction of each item consumed compared to the total amount of each item available; and
a third weighting factor which decays over time.

20. The apparatus of claim 19, wherein the processor is configured to prioritise consumption periods having high first and/or second and/or third weighting factors and/or long time spans when identifying clusters.

21. The apparatus of claim 17, wherein the processor is configured, when constructing a temporal profile, to calculate a function defining a probability that the content associated with a cluster will be consumed at any given time in a reference period.

22. The apparatus of claim 21, wherein the processor is configured to match content descriptors of available items with the content descriptors of each cluster and generate a recommendation for a user device based on the item which matches the cluster which has the highest probability at that time.

23. The apparatus of claim 15, controlled by an operator.

24. A user device for providing content to a user, comprising:
- a receiver for receiving content items and a content descriptor for each item from a network;
- an output unit for providing the content items to the user;
- a controller operatively connected to the receiver and output unit for decoding items received from the operator and forwarding said items to the output unit; and
- a storage medium for maintaining a record of the items provided to the user within a reference period, a time of consumption of each item, and the content descriptor associated with each item;
- wherein the controller is configured to: using the record of items to define a first temporal consumption period associated with a first set of one or more similar content descriptors, wherein defining the first temporal consumption period comprises: (a) using the record of items to identify a first consumed item associated with a first content descriptor, (b) using the record of items to determine a first time period during which the first consumed item was consumed, (c) using the record of items to identify a second consumed item associated with the first content descriptor, (d) using the record to determine a second time period during which the second consumed item was consumed, and (e) defining the first temporal consumption period such that the first temporal consumption period encompasses both the first time period and the second time period (f) calculating a first weighting factor (wf1) for the first temporal consumption period by dividing a sum of a duration (d1) of the first time period and a duration (d2) of the second time period by a duration (D1) of the first temporal consumption period; (g) calculating a second weighting factor (wf2) for the first temporal consumption period by calculating: $wf2=1/D1(d1*w1+d2*w2)$, wherein w1 is a weight associated with the first consumed item and w2 is a weight associated with the second consumed item;
- create an aggregated list of consumption periods recorded over many reference periods and store the aggregated list in the storage medium;
- identify clusters of similar consumption periods in the aggregated list; identify recurring temporal patterns; construct a profile based on the clusters and the recurring temporal patterns for each cluster;
- generate a time-specific recommendation for the user from the profile; and
- cause the output unit to provide the recommendation to the user.

25. A computer program product comprising a non-transitory computer readable medium storing a computer program and maintaining a record of the items provided to the user within a reference period, a time of consumption of each item, and the content descriptor associated with each item, the computer program comprising computer readable code which, when run by a processing unit, causes the processing unit to using the record of items to define a first temporal consumption period associated with a first set of one or more similar content descriptors, wherein defining the first temporal consumption period comprises: (a) using the record of items to identify a first consumed item associated with a first content descriptor, (b) using the record of items to determine a first time period during which the first consumed item was consumed, (c) using the record of items to identify a second consumed item associated with the first content descriptor, (d) using the record to determine a second time period during which the second consumed item was consumed, and (e) defining the first temporal consumption period such that the first temporal consumption period encompasses both the first time period during which the first consumed item associated with the first content descriptor was consumed and the second time period during which the second consumed item associated with the first content descriptor was consumed;
  using the record of items to define a second temporal consumption period associated with a second set of one or more similar content descriptors, wherein defining the second temporal consumption period comprises:
  (a) using the record of items to identify a third consumed item associated with a third content descriptor,
  (b) using the record of items to determine a third time period during which the third consumed item was consumed,
  (c) using the record of items to identify a fourth consumed item associated with a fourth content descriptor,
  (d) using the record to determine a fourth time period during which the fourth consumed item was consumed, said fourth time period not overlapping with said third time period,
  (e) determining whether the fourth content descriptor matches the third content descriptor within a threshold similarity, and
  (e) in response to determining that the fourth content descriptor matches the third content descriptor within a threshold similarity, defining the second temporal consumption period such that the second temporal consumption period encompasses both the third time period and the fourth time period;
  associating the consumption period with the content descriptor;
  creating an aggregated list of consumption periods recorded over a plurality of reference periods;
  identifying clusters of similar consumption periods in the aggregated list;
  identifying recurring temporal patterns;
  constructing a profile based on the clusters and the recurring temporal patterns for each cluster; and
  using the profile to provide a temporal context.

* * * * *